United States Patent
Suzuki

(10) Patent No.: US 12,113,204 B2
(45) Date of Patent: Oct. 8, 2024

(54) METHOD FOR PRODUCING POSITIVE ELECTRODE ACTIVE MATERIAL FOR LITHIUM ION SECONDARY BATTERY, AND MOLDED BODY

(71) Applicant: SUMITOMO METAL MINING CO., LTD., Tokyo (JP)

(72) Inventor: Jun Suzuki, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 621 days.

(21) Appl. No.: 17/421,862

(22) PCT Filed: Dec. 23, 2019

(86) PCT No.: PCT/JP2019/050439
§ 371 (c)(1),
(2) Date: Jul. 9, 2021

(87) PCT Pub. No.: WO2020/145116
PCT Pub. Date: Jul. 16, 2020

(65) Prior Publication Data
US 2022/0109139 A1    Apr. 7, 2022

(30) Foreign Application Priority Data

Jan. 10, 2019   (JP) .................................. 2019-002918

(51) Int. Cl.
H01M 4/36    (2006.01)
H01M 4/04    (2006.01)
(Continued)

(52) U.S. Cl.
CPC ......... H01M 4/364 (2013.01); H01M 4/0433 (2013.01); H01M 4/0471 (2013.01);
(Continued)

(58) Field of Classification Search
None
See application file for complete search history.

(56) References Cited

U.S. PATENT DOCUMENTS

2001/0010807 A1   8/2001   Matsubara
2009/0155689 A1   6/2009   Zaghib et al.
2010/0270496 A1   10/2010  Oki et al.

FOREIGN PATENT DOCUMENTS

CN      101910067 A      12/2010
CN      109065863 A  *   12/2018
(Continued)

OTHER PUBLICATIONS

International Search Report dated Mar. 10, 2020, issued in counterpart Application No. PCT/JP2019/050439, with English Translation. (4 pages).
(Continued)

Primary Examiner — Carlos Barcena
(74) Attorney, Agent, or Firm — WHDA, LLP

(57) ABSTRACT

A method for producing a positive electrode active material for a lithium ion secondary battery containing lithium-nickel composite oxide, includes: mixing a nickel compound, a lithium compound, and organic compound particles to obtain a lithium mixture; molding the lithium mixture to obtain a molded body; firing the molded body to obtain a fired body; and crushing the fired body to obtain lithium-nickel composite oxide powder.

19 Claims, 6 Drawing Sheets

(51) Int. Cl.
  *H01M 4/525* (2010.01)
  *H01M 4/02* (2006.01)
(52) U.S. Cl.
  CPC ...... *H01M 4/525* (2013.01); *H01M 2004/021* (2013.01); *H01M 2004/028* (2013.01)

(56) References Cited

FOREIGN PATENT DOCUMENTS

| | | |
|---|---|---|
| JP | H06-290780 A | 10/1994 |
| JP | H11-135123 A | 5/1999 |
| JP | 2000-072446 A | 3/2000 |
| JP | 2011-146309 A | 7/2011 |
| JP | 2014-049407 A | 3/2014 |
| JP | 2017-208207 A | 11/2017 |
| JP | 2019-172510 A | 10/2019 |
| WO | 98/06670 A1 | 2/1998 |

OTHER PUBLICATIONS

Notification of Transmittal of Translation of the International Preliminary Report on Patentability (Form PCT/IB/338) issued in counterpart International Application No. PCT/JP2019/050439 mailed Jul. 22, 2021 with Forms PCT/IB/373 and PCT/ISA/237. (9 pages).
Office Action dated Sep. 7, 2023, issued in counterpart TW Application No. 109100399, with English Translation, (10 pages).
Extended European Search Report dated Sep. 12, 2022, issued in European Patent Application No. 19909538.1/ PCT/JP2019/050439. (6 pages).
Office Action dated Dec. 14, 2022, issued in counterpart CN application No. 201980088372.5, with English translation. (21 pages).
Office Action dated Jun. 27, 2023, issued in counterpart CN Application No. 201980088372.5, with English translation. (15 pages).

* cited by examiner

METHOD FOR PRODUCING POSITIVE ELECTRODE ACTIVE MATERIAL FOR LITHIUM ION SECONDARY BATTERY, AND MOLDED BODY

TECHNICAL FIELD

The present invention relates to a method for producing a positive electrode active material for a lithium ion secondary battery, and a molded body.

BACKGROUND ART

In recent years, it is strongly desired to develop small-sized and lightweight secondary batteries having a high energy density in association with the widespread use of portable devices such as mobile phones and notebook personal computers. Furthermore, also in environmentally compatible cars called xEVs, transition from hybrid vehicles (HEVs) to plug-in hybrid vehicles (PHEVs) and electric cars (BEVs) requiring high-capacity secondary batteries has proceeded. Of these, BEVs have a shorter running distance per one charge than that of gasoline cars, and for improving this, capacity enlargement of secondary batteries is required.

There is a lithium ion secondary battery as a secondary battery satisfying such requirements. This lithium ion secondary battery includes a negative electrode, a positive electrode, an electrolyte solution, and the like. As an active material of each of the positive electrode and the negative electrode, a material capable of de-inserting and inserting lithium is used.

The lithium ion secondary battery is currently under active research and development. Particularly, a lithium ion secondary battery using a layered or spinel type lithium-metal composite oxide as a positive electrode active material can obtain a high voltage of 4 V-class and therefore has been put into practical use as a battery having a high energy density.

Examples of a positive electrode active material that has been proposed mainly so far include lithium-cobalt composite oxide ($LiCoO_2$) and lithium-nickel composite oxide ($LiNiO_2$) that are relatively easily synthesized, and lithium-manganese composite oxide ($LiMn_2O_4$) and lithium-nickel-cobalt-manganese composite oxide ($LiNi_{1/3}Co_{1/3}Mn_{1/3}O_2$) that use manganese.

Among these, the lithium-nickel composite oxide ($LiNiO_2$) has a high capacity and a high output, is attracting attention as a material satisfying characteristics required for a positive electrode active material of a secondary battery used in PHEVs or BEVs and is increasingly demanded, and is expected to have rapidly growing demand in the future.

Furthermore, a decrease in cost of xEVs is required to further expand the demand therefor. Therefore, a demand for decreasing the cost of the secondary battery that is one of factors contributing to an increase in cost of xEVs is increasing, and it also becomes necessary to reduce the cost of a positive electrode active material that is one of materials constituting the lithium ion secondary battery.

The lithium-nickel composite oxide can be obtained by mixing a compound containing nickel such as a nickel composite hydroxide or a nickel composite oxide, and a lithium compound to prepare a lithium mixture (raw material mixture) and then firing the lithium mixture. The firing of the lithium mixture is performed, for example, at a temperature of about 650° C. or higher and 850° C. or lower for 3 hours or longer. During this firing process, the lithium compound reacts (is sintered) with the compound containing nickel to obtain a lithium-nickel composite oxide having high crystallinity.

The lithium mixture is generally fired in a firing furnace by putting powder of the lithium mixture into a container such as a sagger. However, when the powder is put into the container and fired, thermal conduction between particles of the powder is poor, and it takes a long time for the temperature of the powder in the center of the container to reach a target firing temperature. Furthermore, the generated gas is likely to accumulate in spaces between particles of the powder, the replaceability with the reaction gas is poor, and thus a long reaction time is required. For example, due to these two factors, it is conceivable that an excessively long firing time is required in order to produce a lithium-nickel composite oxide having high crystallinity.

Some firing conditions for efficiently performing the firing of the powder of the lithium mixture have been hitherto proposed.

For example, Patent Literature 1 describes a method in which, in a process of filling a mixture (powder) obtained by mixing a nickel composite compound and a lithium compound in a firing container and firing the mixture, in order to sufficiently diffuse oxygen in the mixture, the minimum holding time for holding the temperature in a specific temperature range and the oxygen concentration range with respect to the filling amount of the mixture (the thickness when the mixture is put in the firing container) are specified respectively, and the mixture is efficiently fired.

Furthermore, some methods are also disclosed in which the lithium mixture is granulated or molded and then fired to obtain a lithium-nickel composite oxide.

For example, Patent Literature 2 describes a method for producing $LiNiO_2$-based layered composite oxide, in which, when at least a nickel salt and a lithium salt are mixed in a predetermined amount to obtain a raw material mixture and the raw material mixture is fired to synthesize $LiNiO_2$, granules obtained by granulating the raw material mixture are fired. Furthermore, in Examples of Patent Literature 2, it is described that about 0.5-mm granules put in an alumina container are charged into a firing furnace, then heated to 700° C. while introducing oxidation gas, and held for 24 hours to obtain a firing-synthesized product. According to Patent Literature 2, a synthesized product having a desired crystal structure can be produced by the above-described production method with high productivity including working aspect.

Furthermore, Patent Literature 3 describes that a raw material mixture containing a lithium raw material is subjected to a process such as granulation and formation to obtain a molded body, the molded body is then fired at a temperature of 700° C. to 1000° C. in an oxidizing atmosphere while being held for 2 to 15 hours so as to synthesize a lithium composite oxide. Furthermore, in Examples of Patent Literature 3, it is described that the raw material mixture is molded by a mold press at a pressure of 2 t/cm$^2$ to obtain a pellet, and this pellet is fired at 800° C. for 10 hours in an atmosphere of pure oxygen.

Furthermore, in Examples of Patent Literature 4, it is described that mixed powder obtained by mixing raw materials is press-molded at a pressing pressure of 500 kg/cm$^2$ into a molded body having a diameter of 50 mm and a thickness of 5 mm, a fragment of an alumina spacer having a thickness of 1 mm is sandwiched at an adequate place of the pressed molded body, and the pressed molded body is fired at 740° C. for 10 hours and then fired continuously at 820° C. while being held for 20 hours. According to Patent Literature 4, the press molding is extremely useful from the viewpoint of shortening an inter-molecule movement distance and promoting crystal growth when firing.

Furthermore, Patent Literature 5 describes that a raw material containing a lithium compound is formed into a slurry, the slurry is spray-dried or freeze-dried to obtain a dried product, and the dried product is fired after being press-molded. Furthermore, in Examples of Patent Literature 5, it is described that the dry gel is molded at a pressure of 2 t/cm$^2$ using a static compressor to obtain a pellet having φ14 and a thickness of 2 mm, and this pellet is put in an alumina boat and fired at 750° C. for 48 hours in an atmosphere of oxygen in a tube furnace.

CITATION LIST

Patent Literature

Patent Literature 1: JP 2011-146309 A
Patent Literature 2: JP 2000-072446 A
Patent Literature 3: JP H11-135123 A
Patent Literature 4: JP H06-290780 A
Patent Literature 5: WO 98/06670 A

SUMMARY OF INVENTION

Technical Problem

However, in the technique described in Patent Literature 1, when the filling amount of the mixed powder is increased in order to enhance productivity, the temperature increase time of the mixture is lengthened, and replacement between the generated gas and reaction gas deteriorates. Thus, the firing time is lengthened, and productivity is limited.

Furthermore, in the technique described in Patent Literature 2, since the granules are filled in the container and fired, thermal conduction may not be sufficient. Furthermore, in the granules having a particle size of less than 1 mm as described in Patent Literature 2 or the powder of the lithium mixture, for example, when the flow rate of atmosphere gas in the firing furnace is increased in order to increase the firing efficiency, the powder or the granules may whirl up from the container and the yield may be decreased.

Further, in the techniques described in Patent Literatures 3 to 5, a molded body larger than that in Patent Literature 2 is formed and fired, there is no whirling-up of the molded body, and improvement in heat conductivity and an increase in raw material insertion amount per unit volume are possible by compacting the raw materials, so that productivity is significantly improved. However, since molding is performed by applying a high pressure of 500 kg/cm$^2$ to 2 t/cm$^2$, the contact area between particles is increased, and as a result, bonding between particles after firing is strong and the fired product becomes harder, so that crushing is difficult to perform. Therefore, an increase in size of a crusher, an increase in crushing force, multi-staging of the crusher, or the like is necessary, investment cost is increased or the crushing time is lengthened, and thus a problem arises in that productivity is degraded.

The present invention has been conceived in view of the aforementioned problems, and an object thereof is to provide a simple method for producing a positive electrode active material having higher productivity and high crystallinity and a molded body which can be suitably used in the method for producing the same.

Solution to Problem

According to a first aspect of the present invention, there is provided a method for producing a positive electrode active material for a lithium ion secondary battery containing lithium-nickel composite oxide, the method including: mixing a nickel compound, a lithium compound, and organic compound particles to obtain a lithium mixture; molding the lithium mixture to obtain a molded body; firing the molded body to obtain a fired body; and crushing the fired body to obtain lithium-nickel composite oxide powder.

Furthermore, it is preferable that the organic compound particles are solid at a temperature of the molded body in molding. Furthermore, the organic compound particles may evaporate at a temperature lower than a melting temperature of the lithium compound. Furthermore, the organic compound particles may be thermally decomposed into a gas at a temperature lower than a melting temperature of the lithium compound. Furthermore, it is preferable that an average particle size of the organic compound particles is 0.1 mm or more and 10 mm or less. Furthermore, it is preferable that a mixing amount of the organic compound particles is 3 mass % or more and 12 mass % or less with respect to the lithium mixture. Furthermore, it is preferable that the nickel compound is composed of a nickel composite oxide, and a density of the molded body is 1.3 g/cm$^3$ or more.

Furthermore, it is preferable that the lithium compound is composed of lithium hydroxide, lithium nitrate, lithium carbonate, lithium acetate, or a mixture thereof. Furthermore, it is preferable that the lithium-nickel composite oxide contains lithium (Li) and nickel (Ni), and optionally cobalt (Co) and an element (M1), and a molar ratio of respective metal elements is represented as Li:Ni:Co:M1=s:(1−x−y):x:y (provided that, 0.93<s<1.30, 0≤x≤0.50, 0≤y≤0.40, and 0.10≤(1−x−y)≤1.0, and M1 is at least one element selected from the group consisting of an element other than Li, Ni, and Co, an alkali metal, an alkali earth metal, a transition metal, a base metal, and a semimetal). Furthermore, it is preferable that the firing is performed at 650° C. or higher and 1000° C. or lower for a holding time of a firing temperature of 10 hours or shorter.

Furthermore, the method may include washing, filtering, and then drying the lithium-nickel composite oxide powder. Furthermore, it is preferable that a lithium site occupancy at the 3a site, which is obtained by Rietveld analysis of an X-ray diffraction pattern, of the lithium-nickel composite oxide is 97.0% or more.

According to a second aspect of the present invention, there is provided a molded body being used in producing of a positive electrode active material for a lithium ion secondary battery, the molded body containing a nickel compound, a lithium compound, and organic compound particles.

Furthermore, the organic compound particles may evaporate at a temperature lower than a melting temperature of the lithium compound. Furthermore, the organic compound particles may be thermally decomposed into a gas at a temperature lower than a melting temperature of the lithium compound. Furthermore, it is preferable that a size of the organic compound particles is 0.1 mm or more and 10 mm or less. Furthermore, it is preferable that a content of the organic compound particles is 3 mass % or more and 12 mass % or less with respect to the molded body. It is preferable that the nickel compound is composed of a nickel composite oxide, and a density of the molded body is 1.3 g/cm$^3$ or more. Furthermore, it is preferable that the lithium compound is composed of lithium nitrate, lithium carbonate, lithium acetate, or a mixture thereof. Furthermore, it is preferable that the nickel compound contains nickel (Ni) and optionally cobalt (Co) and an element (M1), and a molar ratio of respective metal elements is represented as Ni:Co:M1=(1−x−y):x:y (provided that, 0≤x≤0.50, 0≤y≤0.40, and 0.10≤(1−x−y)≤1.0, and M1 is at least one element selected from the group consisting of an element other than Ni and Co, an alkali metal, an alkali earth metal, a transition metal, a base metal, and a semimetal).

Advantageous Effects of Invention

According to the present invention, it is possible to provide a simple method for producing a positive electrode active material having higher productivity and high crystallinity and a molded body which can be suitably used in the method for producing the same.

DESCRIPTION OF EMBODIMENTS

Figure 1:
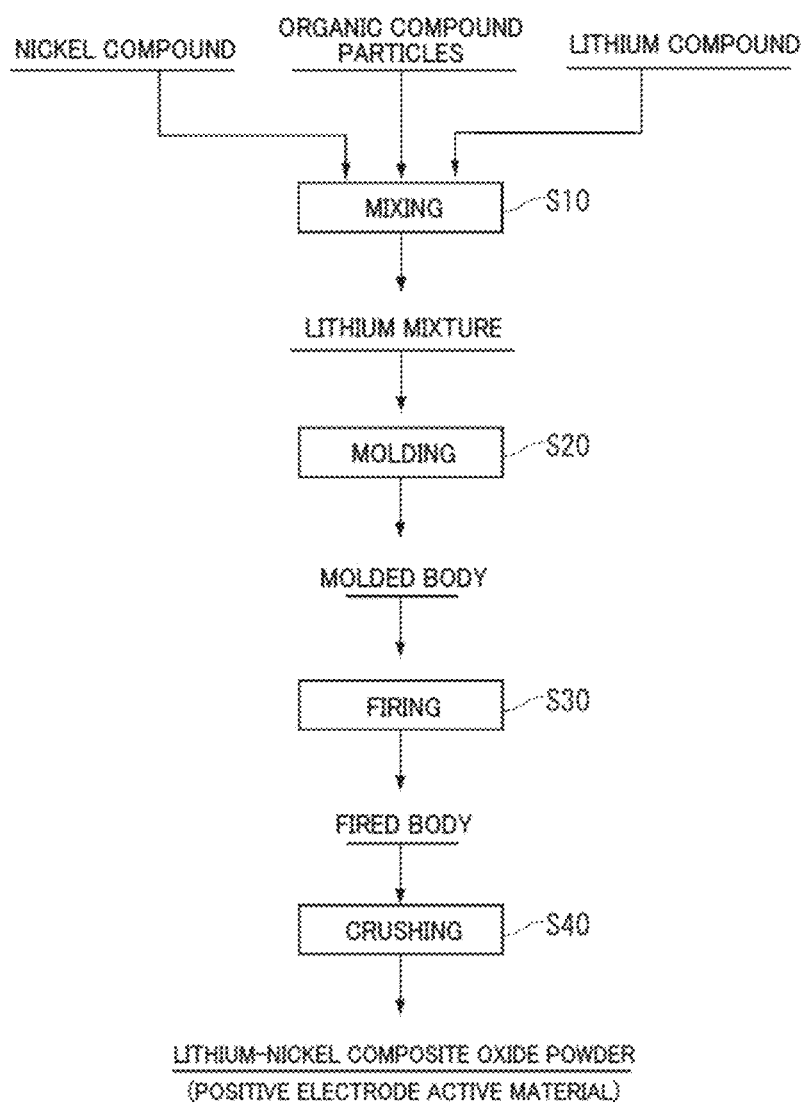
FIG. 1 is a diagram illustrating an example of the flow of a method for producing lithium-nickel composite oxide powder.

Hereinafter, embodiments of the present invention will be described with reference to the drawings. However, the present invention is not limited to the embodiments to be described below. Note that in the drawings, in order to make it easy to understand each configuration, some parts are emphasized or simplified, and actual structures, shapes, scales, and the like may be different from those of the drawings.

1. Method for Producing Positive Electrode Active Material for Lithium Ion Secondary Battery The present embodiment is a method for producing a positive electrode active material for a lithium ion secondary battery containing a lithium-nickel composite oxide (hereinafter, also simply referred to as "positive electrode active material"). The lithium-nickel composite oxide is an oxide containing lithium, nickel, and optionally other elements. The lithium-nickel composite oxide may have a layered crystal structure, or may include secondary particles that are formed by an aggregation of primary particles.

FIG. 1 is a diagram illustrating an example of the flow of a method for producing a positive electrode active material according to the present embodiment. As illustrated in FIG. 1, the method for producing a positive electrode active material includes, for example, mixing a nickel compound, a lithium compound, and organic compound particles to obtain a lithium mixture (mixing process: step S10), molding the lithium mixture to obtain a molded body (molding process: step S20), firing the molded body to obtain a fired product of the molded body (fired body) (firing process: step S30), and crushing the fired body to obtain lithium-nickel composite oxide powder (crushing process: step S40). Hereinafter, the respective processes will be described.

[Mixing Process: Step S10]

First, a nickel compound, a lithium compound, and organic compound particles are mixed to obtain a lithium mixture (step S10). Note that, the lithium mixture may contain a binder that binds the particles of the respective compounds in order to form a molded body having a sufficient strength, as described below.

(Nickel Compound)

The nickel compound used in the present embodiment is not particularly limited as long as it is a compound containing nickel, and a known compound can be used. Furthermore, the nickel compound may contain at least one or more of cobalt, aluminum, and manganese, in addition to nickel.

The nickel compound may contain, for example, nickel (Ni) and optionally cobalt (Co) and an element (M1), and a molar ratio of respective metal elements may be represented as Ni:Co:M1=(1−x−y):x:y (provided that, 0≤x≤0.50, 0≤y≤0.40, and 0.10≤(1−x−y)≤1.0, and M1 is at least one element selected from the group consisting of an element other than Li, Ni, and Co, an alkali metal, an alkali earth metal, a transition metal, a base metal, and a semimetal). Furthermore, M1 may contain manganese (Mn) or may contain aluminum (Al). Note that, the nickel compound may contain a small amount of an element other than the above-described element.

Furthermore, from the viewpoint of obtaining a high battery capacity, the nickel compound may contain nickel (Ni), cobalt (Co), and aluminum (Al), and an atomic number ratio of respective elements may be represented as Ni:Co:Al=(1−x−y):x:y (provided that, 0.03≤x≤0.10 and 0.03≤y≤0.10). Note that, the nickel compound may contain a small amount of an element other than the above-described element.

As the nickel compound, for example, at least one of a hydroxide containing nickel and an oxide containing nickel can be used. Hereinafter, these compounds will be described.

(Hydroxide Containing Nickel)

The hydroxide containing nickel includes a hydroxide containing nickel and optionally a metal other than nickel (nickel composite hydroxide). The nickel composite hydroxide may contain at least one or more of cobalt, aluminum, and manganese, in addition to nickel. As the nickel composite hydroxide, for example, nickel-cobalt composite hydroxide, nickel-cobalt-aluminum composite hydroxide, nickel-cobalt-manganese composite hydroxide, and the like are used. Furthermore, the nickel composite hydroxide may contain elements such as an alkali metal, an alkali earth metal, a transition metal, a base metal, and a semimetal.

The method for producing a hydroxide containing nickel is not particularly limited, and for example, a crystallization method can be used. In the hydroxide containing nickel obtained by the crystallization method, the composition in the whole particles becomes homogeneous and the composition of the positive electrode active material finally obtained also becomes homogeneous.

(Oxide Containing Nickel)

The oxide containing nickel includes an oxide containing nickel and optionally a metal other than nickel (nickel composite oxide). The nickel composite oxide may contain at least one or more of cobalt, aluminum, and manganese, in addition to nickel. As the nickel composite oxide, for example, nickel-cobalt composite oxide, nickel-cobalt-aluminum composite oxide, nickel-cobalt-manganese composite oxide, and the like are used. Furthermore, the nickel composite oxide may contain elements such as an alkali metal, an alkali earth metal, a transition metal, a base metal, and a semimetal.

From the viewpoint of a high battery capacity, it is preferable that the nickel composite oxide contains, for example, nickel (Ni), cobalt (Co), and aluminum (Al), and an atomic number ratio (molar ratio) of respective elements is represented as $Ni:Co:Al=(1-x-y):x:y$ ($0.03 \leq x \leq 0.10$ and $0.03 \leq y \leq 0.10$). Note that, the ratio of respective elements contained in the nickel composite oxide is succeeded to the molded body and the lithium-nickel composite oxide. Therefore, the composition of the whole nickel composite oxide can be set to be similar to the composition of metals other than lithium of the lithium-nickel composite oxide.

Furthermore, the nickel composite oxide may contain, for example, nickel (Ni), cobalt (Co), aluminum (Al), and an element M other than those, and an atomic number ratio (molar ratio) of respective elements may be represented as $Ni:Co:Al:M=(1-x-y):x:y:z$ ($0.03 \leq x \leq 0.10$, $0.03 \leq y \leq 0.10$, and $0 \leq z \leq 0.10$, and M is an element other than Li, Ni, Co, Al, and O). Furthermore, the element M may be, for example, at least one selected from the group consisting of an alkali metal, an alkali earth metal, a transition metal, a base metal, and a semimetal.

The oxide containing nickel is obtained, for example, by oxidizing the aforementioned hydroxide containing nickel. By conversion of the hydroxide containing nickel into the oxide, the amount of water vapor generated when a molded body composed of the lithium mixture is fired is decreased, and the sintering reaction is further promoted. Therefore, when the oxide containing nickel is used as the nickel compound, a lithium-nickel composite oxide having high crystallinity can be obtained with high productivity by firing in an extremely short time.

(Method for Producing Nickel Compound)

Figure 2:
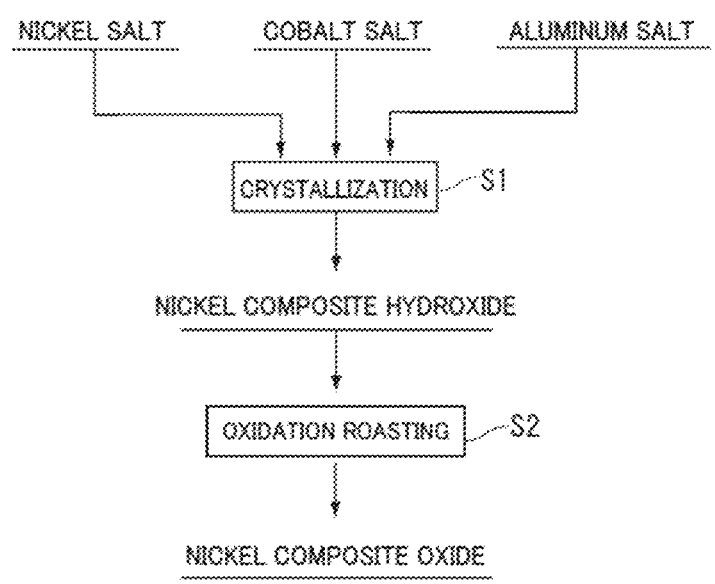
FIG. 2 is a diagram illustrating an example of the flow of a method for producing a nickel composite oxide.

FIG. 2 is a diagram illustrating a method for producing a nickel composite oxide as an example of the method for producing a nickel compound. For example, the nickel composite oxide can be obtained by a method including oxidation-roasting the nickel composite hydroxide, which is obtained by crystallization (step S1), (step S2), as illustrated in FIG. 2. In the nickel composite hydroxide obtained by crystallization, the composition in the whole particles becomes homogeneous and the composition of the positive electrode active material finally obtained also becomes homogeneous. Note that, the nickel compound may be obtained by a method other than the production method illustrated in FIG. 2. Hereinafter, a method for producing nickel-cobalt-aluminum composite oxide as an example of the nickel compound will be described with reference to FIG. 2.

[Crystallization Process; Step S1]

The nickel composite hydroxide is obtained by supplying a neutralizing agent or the like to an aqueous solution containing a nickel-containing salt (Ni salt), a cobalt-containing salt (Co salt), and an aluminum-containing salt (Al salt) and performing crystallization (step S1). As a specific example, the nickel composite hydroxide can be produced by performing neutralization using an alkaline aqueous solution in the presence of a complexing agent such as an ammonium ion supplier while stirring an aqueous solution containing a nickel salt, a cobalt salt, and an aluminum salt and performing a crystallization reaction. The nickel composite hydroxide obtained by a crystallization method is configured by secondary particles with a plurality of aggregated primary particles, and a positive electrode active material obtained by using particles of this nickel composite hydroxide as a precursor is also configured by secondary particles with a plurality of aggregated primary particles.

As the metal salt used when the aqueous solution containing a metal salt is prepared, for example, sulfate, nitrate, and chloride of each of nickel, cobalt, and aluminum can be used. Furthermore, the aqueous solution of the metal salt may contain a salt containing an element M other than nickel, cobalt, and aluminum.

It is preferable that the nickel composite hydroxide can contain nickel (Ni), cobalt (Co), aluminum (Al), and optionally other element M, and a molar ratio of respective elements is represented as $Ni:Co:Al:M=(1-x-y):x:y:z$ ($0.03 \leq x \leq 0.10$, $0.03 \leq y \leq 0.10$, $0 \leq z \leq 0.10$, and M is at least one element selected from the group consisting of an alkali metal, an alkali earth metal, a transition metal, a base metal, and a semimetal). The ratio of respective elements contained in the nickel composite hydroxide is succeeded to the nickel composite oxide, the molded body, and the lithium-nickel composite oxide. Therefore, the composition of the whole nickel composite hydroxide can be set to be similar to the composition of metals other than lithium of the lithium-nickel composite oxide. Note that, the nickel composite hydroxide is not via an oxidation roasting process (step S2) described below, and may be mixed with the lithium compound to obtain a lithium mixture.

Note that, the crystallization method is not particularly limited, and for example, a continuous crystallization method, a batch method, and the like can be used. The continuous crystallization method is, for example, a method for continuously collecting the nickel composite hydroxide overflowed from a reaction container, and a large amount of nickel composite hydroxides having compositions equal to each other can be simply produced. Furthermore, since the nickel composite oxide obtained by the continuous crystallization method has a wide particle size distribution, the filling density of a molded body obtained using this nickel composite oxide can be improved. Note that, the particle size of the nickel composite hydroxide is, for example, 1 µm or more and 50 µm or less.

By the batch method, a nickel composite hydroxide having a more uniform particle size and a narrow particle size distribution can be obtained. A molded body obtained using the nickel composite hydroxide obtained by the batch method can more uniformly react with the lithium compound at the time of firing. Furthermore, the nickel composite hydroxide obtained by the batch method can reduce contamination of fine powder that is one of causes degrading cycle characteristics or output characteristics when the nickel composite hydroxide is used in a secondary battery.

[Oxidation Roasting Process: Step S2]

Next, the nickel composite hydroxide is oxidation-roasted (heat-treated), and thereby a nickel composite oxide is obtained (step S2). The oxidation roasting conditions are not particularly limited as long as they are conditions in which the most part of the nickel composite hydroxide is converted into a nickel composite oxide, and for example, the oxidation roasting temperature is preferably 600° C. or higher and 800° C. or lower. When the oxidation roasting temperature is lower than 600° C., moisture remains in the nickel composite hydroxide (precursor) and oxidation may not sufficiently proceed. On the other hand, when the oxidation roasting temperature exceeds 800° C., composite oxides may be bound to each other to form coarse particles. Furthermore, when the oxidation roasting temperature is too high, a large quantity of energy is used, and thus productivity is degraded in terms of cost, which is not suitable in terms of industrial aspect.

The oxidation roasting time is, for example, preferably 0.5 hours or longer and 3.0 hours or shorter. When the oxidation roasting time is shorter than 0.5 hours, the oxidation of the nickel composite hydroxide may not sufficiently proceed. On the other hand, when the oxidation roasting time is longer than 3.0 hours, energy cost is increased, and productivity is degraded, which is not suitable in terms of industrial aspect.

(Lithium Compound)

The lithium compound refers to a compound containing lithium. The lithium compound is not particularly limited, and a known lithium compound can be used. For example, lithium hydroxide, lithium nitrate, lithium carbonate, lithium acetate, or a mixture thereof can be used. Among these, at least one of lithium hydroxide and lithium carbonate is preferably used.

Furthermore, the lithium compound is preferably lithium hydroxide from the viewpoint of increasing reactivity at the time of sintering and further shortening the firing time. Although it is necessary to add a binder binding particles in order to form a molded body having a sufficient strength at the time of mixing depending on the type of the lithium compound, when lithium hydroxide is used as the lithium compound, the particles are bound by the properties of the lithium hydroxide, and thus a binder is not necessary depending on molding conditions. When the lithium mixture does not contain a binder, contamination of impurities in the positive electrode active material can be further suppressed.

As the lithium hydroxide, a hydrate such as lithium hydroxide monohydrate ($LiOH \cdot H_2O$) or an anhydride such as anhydrous lithium hydroxide (LiOH) can be used. Of these, anhydrous lithium hydroxide is preferred, and lithium hydroxide having a moisture content of 1.5% or less and a total carbon (total carbon content) of 1.0% or less is more preferred.

The lithium hydroxide having a moisture content of 1.5% or less and a total carbon of 1.0% or less can be obtained, for example, by heat-treating lithium hydroxide hydrate ($LiOH \cdot H_2O$). When such lithium hydroxide is used, the amount of moisture generated in the firing process (step S30) is small, the synthesis reaction of the lithium-nickel composite oxide is promoted, and the firing time can be shortened. Note that, the moisture content is calculated by vacuum-drying lithium hydroxide to be measured at 200° C. for 8 hours and then measuring the weights before and after vacuum drying when the moisture content rate of the obtained lithium hydroxide is regarded as 0 mass %. Furthermore, the total carbon (total carbon content) is a value that can be measured by a high-frequency combustion-infrared absorption method.

(Organic Compound Particles)

The lithium mixture contains organic compound particles. The organic compound particles get out of the inside of the molded body by vaporization, sublimation, or thermal decomposition in the firing process (step S30), and a plurality of voids can be formed in the molded body after firing (fired body) (see FIG. 4(A)). When the voids are formed inside the fired body, the crushability of the fired body can be improved.

The type of the organic compound particles is not particularly limited, and a known organic compound can be used; however, those with which an organic compound or a decomposed product thereof does not remain in the molded body after firing are preferred.

At the time of molding the lithium mixture (step S20), at least some of the organic compound particles exist as solid. In order for the organic compound particles to exist as solid at the time of molding of the lithium mixture, the melting point of the organic compound particles or the sublimation temperature is preferably higher than the temperature of the molded body in molding. For example, in the case of usual working environment, the melting point of the organic compound particles or the sublimation temperature may be 25° C. or higher or may be 35° C. or higher. Furthermore, when a molded body is molded at a high-temperature place such as a room with a firing furnace, organic compound particles having a melting point or a sublimation temperature higher than the ambient temperature of the place may be used.

Furthermore, the organic compound particles are preferably evaporated, sublimated, or thermally decomposed at a temperature lower than the firing temperature of the molded body. Thereby, the residual amount of the organic compound particles in the molded body after firing (fired body) can be decreased.

Furthermore, the organic compound particles are more preferably evaporated, sublimated, or thermally decomposed at a temperature lower than a melting point of the lithium compound. In this case, in the firing process (step S30), the loophole of the gas generated by vaporization, sublimation, or thermal decomposition of the organic compound particles is not blocked by the melted lithium compound or the sintered lithium-nickel composite oxide, and thus the gas derived from the organic compound particles easily gets out of the molded body. For example, when an anhydride of lithium hydroxide is used as the lithium compound, since the melting point of the lithium compound is about 470° C., organic compound particles that are evaporated, sublimated, or thermally decomposed at about 460° C. or lower are preferred.

The size of the organic compound particles is not particularly limited, and is, for example, 0.1 mm or more and 10 mm or less and preferably 1 mm or more and 7 mm or less in terms of average particle size. When the average particle size of the organic compound particles is too small, voids in the molded body that are formed when firing are small, and the crushability may not be sufficiently improved. When the average particle size of the organic compound particles is too large, the strength of the molded body is decreased, and the molded body may be broken when being conveyed from a molding machine to a firing furnace. The broken molded body is difficult to automatically convey and transfer and is manually conveyed and transferred, which leads to an increase in cost. Note that, the average particle size of the organic compound particles is, for example, a median size (D50) in the cumulative volume distribution and is measured by a particle size distribution measuring device based on a laser diffraction scattering method.

An organic compound used in the organic compound particles is not particularly limited as long as it has the above-described characteristics, and for example, a general resin such as polyethylene, polypropylene, or polyamide, stearic acid, polyoxymethylene, and the like can be used. Among these, stearic acid, polyoxymethylene, or a mixture thereof is more preferred because a decomposed product when firing remains less. Note that, the organic compound particles may be used singly, or two or more kinds thereof may be used.

(Lithium Mixture)

Regarding the mixing ratio of the nickel compound and the lithium compound, the nickel compound and the lithium compound are mixed such that a ratio (Li/Me ratio) of the total number of atoms (Me) of the metal in the nickel compound and the number of atoms (Li) of lithium is preferably in a range of more than 0.93 and less than 1.30. When the Li/Me ratio is 0.93 or less, in the firing process (step S30), some of the nickel compound remains without reacting, and sufficient battery performance may not be obtained. On the other hand, when the Li/Me ratio is 1.30 or more, in the firing process (step S30), sintering is promoted, and the fired product becomes too hard to deteriorate crushing or the particle size or crystallite diameter of a lithium-nickel composite oxide to be obtained becomes too large so that sufficient battery performance may not be obtained.

Since the required value of the Li/Me ratio varies depending on a difference in configuration of secondary batteries, or the like, the value of the Li/Me ratio can be appropriately set within the above range. Note that, the value of the Li/Me ratio may be, for example, 0.93 or more and less than 1.20, 0.93 or more and less than 1.10, 0.95 or more and less than 1.03, or 1.0 or more and less than 1.03.

Furthermore, since the Li/Me ratio is hardly changed before and after the firing process (step S30), the Li/Me ratio in the lithium mixture is almost maintained even in the lithium-nickel composite oxide. Therefore, the mixing ratio of the nickel compound and the lithium compound can be appropriately adjusted to be equal to the Li/Me ratio in the lithium-nickel composite oxide which is desired to be obtained.

The mixing ratio of the organic compound particles is preferably 3 mass % or more and 12 mass % or less and more preferably 5 mass % or more and 10 mass % or less with respect to the lithium mixture (the total of the nickel compound, the lithium compound, and the organic compound particles). When the mixing ratio of the organic compound particles is less than 3 mass %, the number of voids inside the molded body that are formed when firing is small, and crushability is not improved much. When the mixing ratio is more than 12 mass %, not only are the amounts of the nickel compound and the lithium compound decreased to degrade productivity, but also the strength of the molded body is decreased so that a probability of breaking the molded body during conveyance to a firing furnace is increased.

A general mixer can be used in mixing of the nickel compound, the lithium compound, and the organic compound particles, and for example, a shaker mixer, a Loedige mixer, a *Julia* mixer, a V blender, or the like can be used. Furthermore, regarding this mixing, those materials may be mixed to a sufficient degree such that the shape of the nickel composite oxide is not destroyed. When mixing is not sufficiently performed, the Li/Me ratio may vary between individual particles and a problems may arise in that sufficient battery characteristics are not obtained.

(Binder)

The lithium mixture may contain a binder. When the lithium mixture contains a binder, the moldability of the lithium mixture is improved, and molded bodies having various shapes can be easily formed. For example, when lithium carbonate is used as the lithium compound, by containing a binder, a molded body having a sufficient strength can be easily obtained. As the binder, a known binder can be used, and for example, polyvinyl alcohol, polyacrylamide, carboxymethyl cellulose, and the like can be used. Among these, polyvinyl alcohol is preferably used. The binder may be dissolved in a solvent (for example, water or the like) and used as a binder solution.

The content of the binder in the lithium mixture can be set to, for example, 0.05 mass % or more and 0.2 mass % or less and preferably 0.08 mass % or more and 0.12 mass % or less with respect to the lithium mixture. When the content of the binder is in the above range, a molded body having an adequate strength can be produced. When the content of the binder is too large, since the adhesive strength of each particle constituting the molded body becomes too high, the discharge efficiency of produced gas generated by reaction between lithium and nickel composite oxide may deteriorate or the amount of carbon dioxide gas generated by decomposition of the binder may be increased so that the produced gas cannot be discharged from the inside of the molded body to increase the internal pressure of the molded body, thereby crushing the molded body.

Furthermore, the lithium mixture may not contain a binder. For example, when lithium hydroxide is used as the lithium compound, a molded body can be formed only using a nickel composite oxide and lithium hydroxide without using a binder. When a binder is not used, the content of impurities (for example, carbon or the like) in a lithium-nickel composite oxide to be obtained can be reduced.

[Molding of Molded Body: Step S20]

Next, the lithium mixture is molded to obtain a molded body (step S20). By molding the lithium mixture to increase the density, the contact area between particles of the lithium mixture is increased and the voids between particles are decreased so as to enhance heat transfer, and by decreasing the voids between particles, the moisture or the generated gas in the lithium mixture is likely to be discharged so as to efficiently supply the reaction gas to the inside of the molded body. Therefore, firing can be efficiently performed in an extremely short time.

(Density of Molded Body)

The density of the molded body is preferably 1.3 g/cm$^3$ or more and more preferably 1.4 g/cm$^3$ or more, from the viewpoint of the strength before firing. When the density of the molded body is less than 1.3 g/cm$^3$, the strength of the molded body is low, and the molded body may be broken at the time of handling. Furthermore, when the density of the molded body is less than 1.4 g/cm$^3$, the yield may decrease due to chipping at the corners or ridge line parts.

On the other hand, the upper limit of the density of the molded body is not particularly limited, it is sufficient to set a density at which the particle structure of the nickel composite oxide is maintained, and the upper limit of the density is 2.0 g/cm$^3$ or less, for example, when the metal elements of the nickel composite oxide are nickel, cobalt, and aluminum and the lithium compound is anhydrous lithium hydroxide. Note that, when the particle structure of the nickel composite oxide in the molded body is collapsed, the battery characteristics of a positive electrode active material to be obtained are degraded. Furthermore, when consolidation is performed so that the particle structure of the nickel composite oxide is collapsed, since it is necessary to apply an extremely large pressure, the introduction cost of a molding machine is extremely increased.

From the viewpoint of further increasing reactivity, the density of the molded body in the firing process (step S30) is preferably 1.3 g/cm$^3$ or more, for example, when the metal elements of the nickel composite oxide are nickel, cobalt, and aluminum and the lithium compound is anhydrous lithium hydroxide. When the density of the molded body is in the above range, the heat conductivity to the inside of the molded body in the firing process (step S30) becomes extremely favorable.

As described below, when the density of the molded body is too high, the crushability in crushing (step S40) is deteriorated, and the particle size distribution may broaden. From this point, for example, when the metal elements of the nickel composite oxide are nickel, cobalt, and aluminum and the lithium compound is anhydrous lithium hydroxide, the density of the molded body is preferably 1.7 g/cm³ or less and more preferably 1.6 g/cm³ or less. Even when the density of the molded body exceeds 1.7 g/cm³, by using the present invention, rough crushing in which the molded body is crushed to have a particle size of about several millimeters is favorably performed; however, when the molded body is crushed to have a particle size of about several tens of µm, coarse particles having a particle size of hundreds of µm or more and fine particles having a particle size of several micrometers or less are increased, and the particle size distribution broadens.

From some viewpoints described above, the density of the molded body suitable for characteristics of the nickel composite oxide or the lithium compound can be selected. For example, when the metal elements of the nickel composite oxide are nickel, cobalt, and aluminum and the lithium compound is anhydrous lithium hydroxide, the density is preferably 1.3 g/cm³ or more and 2.0 g/cm³ or less, more preferably 1.4 g/cm³ or more and 1.7 g/cm³ or less, and further preferably 1.4 g/cm³ or more and 1.6 g/cm³ or less.

(Shape of Molded Body)

Figure 3A:
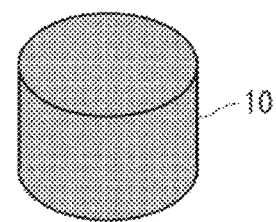
FIGS. 3(A) to 3(C) are diagrams illustrating examples of a molded body.
Figure 3B:
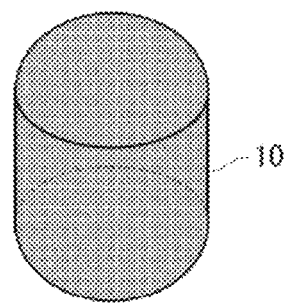
Figure 3C:
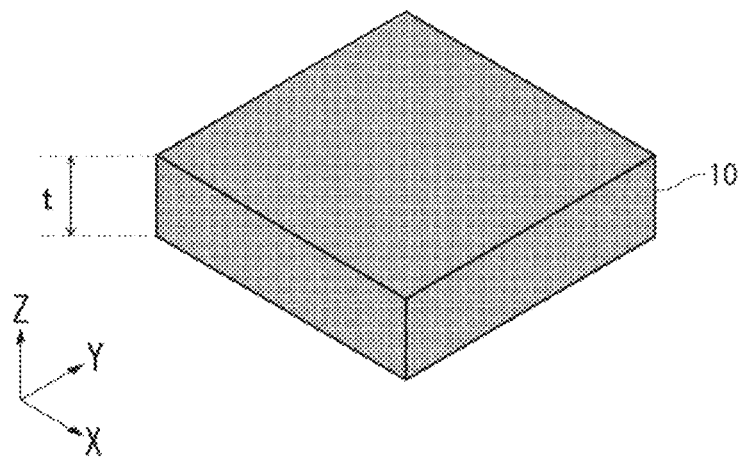

FIGS. 3(A) to 3(C) are a diagram illustrating an example of a molded body used in the present embodiment. The shape of a molded body 10 is not particularly limited, and may be any shape such as a briquette, a pellet, a tablet, a plate, or a spherical shape. The shape of the molded body 10 may be, for example, substantially a cylindrical shape or substantially an elliptical shape as illustrated in FIGS. 3(A) and 3(B), or may be a plate shape (including a tabular shape and a quadrilateral prism shape) as illustrated in FIG. 3(C). Furthermore, the shape of the molded body 10 is preferably a plate shape (including a tabular shape and a quadrilateral prism shape) having high filling property in a firing device, from the viewpoint of productivity. Note that, a quadrilateral prism includes a rectangular and a cubic shape.

(Size of Molded Body)

The size of the molded body is not particularly limited, and may be set in a range that enables the molded body to be formed. For example, when the maximum value of a distance between two points on the outer shape of the molded body is 1 mm or more, a yield in the producing process of the molded body can be 90% or more. Furthermore, the upper limit of the size of the molded body is not particularly limited, and can be appropriately selected according to the inner shape of a firing furnace. Note that, from the viewpoint of improving handleability and productivity, the maximum value of the distance between two points on the outer shape of the molded body is preferably 10 mm or more and 1000 mm or less, more preferably 50 mm or more and 500 mm or less, and further preferably 100 mm or more and 500 mm. Furthermore, as shown in Examples described below, molded bodies in which the maximum value of the distance between two points on the outer shape of the molded body is within a range of 100 mm or more and 500 mm or less have the same degree of high thermal conductivity, and thus, from the viewpoint of further improving productivity, the maximum value of the distance between two points on the outer shape of the molded body may be 350 mm or more and 500 mm or less.

For example, when the molded body 10 is a plate shape (including a tabular shape and a quadrilateral prism shape) as illustrated in FIG. 3(C), a thickness (t) of the molded body 10 is preferably 10 mm or more and 200 mm or less and more preferably 10 mm or more and 100 mm or less. Furthermore, an area of the cross-section perpendicular to the thickness direction of the molded body 10 may be, for example, 10 mm² or more and 200000 mm² or less, or may be 100 mm² or more and 50000 mm² or less.

A device for producing a molded body is not particularly limited as long as it can pressurize the lithium mixture, and for example, a granulating machine, a tableting machine, a briquetting machine, a press, and the like can be used. For example, when a plate-shaped molded body having long and short sides of 10 mm or more and 1000 mm or less and a thickness of 10 mm or more and 200 mm or less is produced, an oil hydraulic pressing machine is preferably used.

A surface pressure at the time of molding (step S20) is appropriately adjusted according to the composition of the lithium mixture, the powder characteristics of raw materials, the shape of the molded body, and the like, and for example, when a plate-shaped molded body is obtained, the surface pressure during molding may be 100 kg/cm² or more and 2000 kg/cm² or less, or may be 150 kg/cm² or more and 1500 kg/cm² or less. Furthermore, when the lithium mixture does not contain a binder, the surface pressure may be 200 kg/cm² or more.

[Firing: Step S30]

Next, the molded body is fired (firing process, step S30). By firing the molded body, the nickel compound and the lithium compound react with each other to generate a lithium-nickel composite oxide. By molding the lithium mixture to obtain a molded body and firing the aforementioned molded body, a lithium-nickel composite oxide (positive electrode active material) having crystallinity equal to or higher than that in the related art can be obtained in an extremely shorter time than a firing time in the related art.

The firing conditions are not particularly limited as long as they are conditions in which the nickel compound and the lithium compound in the molded body react with each other to form a lithium-nickel composite oxide, and for example, firing is performed while gradually increasing the temperature from room temperature and holding the temperature in a temperature range of 650° C. or higher and 1000° C. or lower. When the firing temperature is lower than 650° C., diffusion of lithium is not sufficiently performed, unreacted particles of the lithium compound may remain or the crystal structure of the lithium-nickel composite oxide may not be sufficiently arranged so that a secondary battery using the obtained positive electrode active material may not have sufficient battery characteristics. On the other hand, when the firing temperature exceeds 1000° C., sintering may violently occur between the particles of the lithium-nickel composite oxide and abnormal grain growth may occur so as to decrease the specific surface area. Furthermore, the specific surface area of the positive electrode active material is decreased to increase the resistance of the positive electrode in the secondary battery so that the battery capacity may be decreased. Note that, the firing temperature can be appropriately adjusted according to the composition and the shape of the molded body, and for example, when the metal elements contained in the nickel composite oxide are nickel, cobalt, and aluminum and the lithium compound is anhydrous lithium hydroxide, the firing temperature may be 650° C. or higher and 850° C. or may be 720° C. or higher and 790° C. or lower.

The time for holding the molded body at the above-described firing temperature (hereinafter, also referred to as "holding time") is not particularly limited as long as a lithium-nickel composite oxide having high crystallinity is formed, and is, for example, 10 hours or shorter, may be 5 hours or shorter, or may be 3 hours or shorter. Furthermore, when the metal elements of the nickel composite oxide are nickel, cobalt, and aluminum and the lithium compound is anhydrous lithium hydroxide, the holding time is, for example, 5 hours or shorter, preferably 3 hours or shorter, and more preferably 2.5 hours or shorter, and may be shorter than 2.5 hours. As the firing time is shorter, productivity is improved. Furthermore, the lower limit of the firing time is, for example, 1 hour or longer and may be 2 hours or longer.

The temperature increase rate of the center of the molded body is not particularly limited, and is, for example, 4° C./min or more and preferably 5° C./min or more. Note that, the temperature increase rate of the center of the molded body can be measured by inserting a thermocouple to the center of the molded body.

The atmosphere when firing is preferably an air atmosphere or an oxidizing atmosphere having an oxygen concentration equal to or higher than the air atmosphere and more preferably an atmosphere having an oxygen concentration of 60 vol % or more, and the oxygen concentration may be 100 vol %. In other words, firing is preferably performed in an oxygen flow. When the oxygen concentration in the atmosphere when firing is less than 60 vol %, a necessary amount of oxygen for the reaction between the nickel composite oxide and the lithium compound cannot be supplied, and the lithium-nickel composite oxide may not be sufficiently formed.

The firing furnace is not particularly limited, any firing furnace may be used as long as heating can be performed in an oxygen flow, and a vertical furnace, a rotary hearth furnace, a roller hearth kiln, and the like can be used. Among these, from the viewpoint of facility investment and running cost, a roller hearth kiln is preferably used.

[Crushing Process: Step S40]

Next, the fired body (the lithium-nickel composite oxide, the fired product of the molded body) obtained after firing (step S30) is crushed (step S40). By crushing, secondary particles of the lithium-nickel composite oxide in which aggregation or light sintering occurs can be separated from each other, and the average particle size or particle size distribution of a positive electrode active material to be obtained can be adjusted in a suitable range.

When the molded body is fired, a fired body to be obtained maintains the shape at the time of molding before firing. Regarding the crushing of the fired body, the fired body is preferably crushed, for example, into particles having a size of 50 μm or less. Note that, crushing means operation to apply mechanical energy to the aggregate which is composed of a plurality of secondary particles and generated by sintering necking between the secondary particles when firing and the like, thus to separate the secondary particles from each other while hardly destroying the secondary particles themselves, and to loosen the aggregate.

Figure 4A:
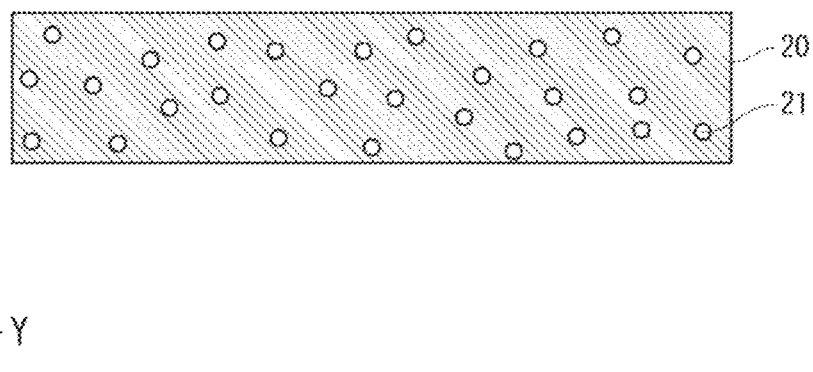
FIG. 4(A) is a schematic diagram of a cross-section of a fired body according to the present embodiment.
Figure 4B:
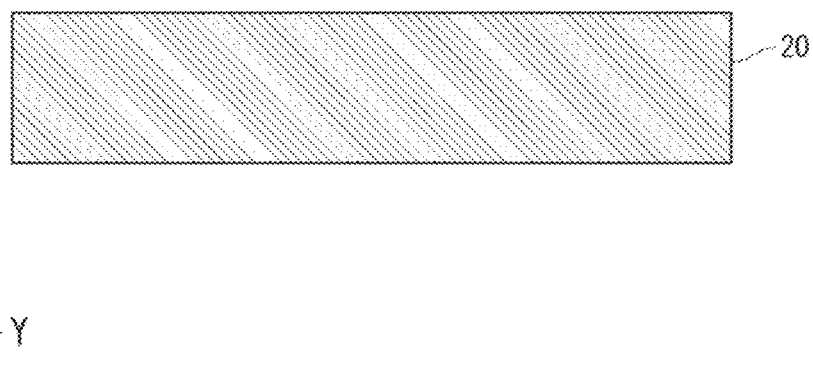
FIG. 4(B) is a schematic diagram of a cross-section of a fired body in the related art.

FIG. 4(A) is a diagram illustrating an example of a cross-section of a fired body according to the present embodiment, and FIG. 4(B) is a diagram illustrating an example of a cross-section of a fired body in the related art not containing organic compound particles. As illustrated in FIG. 4(A), a plurality of voids 21 derived from the organic compound particles are formed inside a fired body 20. When the voids 21 are formed inside the fired body 20, the crushability of the fired body 20 can be improved.

The size of the void of the fired body 20 is preferably 0.1 mm or more and 10 mm or less and more preferably 1 mm or more and 7 mm or less in terms of diameter. When the voids 21 are smaller than 0.1 mm, crushability may not be improved much. On the other hand, when the voids 21 are larger than 7 mm, although crushability is improved, the strength of the fired body 20 may be decreased. Note that, the size and the ratio of the voids 21 can be appropriately adjusted by adjusting the particle size and the mixing ratio of the organic compound particles.

As the method of crushing, a known means can be used, and for example, a pin mill, a hammer mill, a crusher with a classification function, and the like can be used. Note that, it is preferable to adjust the crushing force to a proper range so as not to destroy the secondary particles at this time.

Furthermore, when the molded body has a size that cannot be treated by a pin mill or a hammer mill, for example, when the maximum value of the distance between two points on the outer shape of the molded body is about 10 mm or more, the molded body can be roughly crushed into less than 10 mm by a roll crusher or the like before being crushed by a pin mill or a hammer mill.

Further, for example, when the thickness of the molded body is 30 mm or more or the maximum value of the distance between two points on the outer shape is 100 mm or more, since rough crushing is difficult to perform by a roll crusher having a distance between rolls of several millimeters or less, the molded body can also be crushed by a crusher such as a jaw crusher before rough crushing; however, if the molded body is destroyed by a dropping impact with increasing a drop distance when the molded body is dropped to the roll crusher, the introduction cost of a device can be small. When the molded body is destroyed by the drop distance, it is preferably that a plurality of voids are formed inside the molded body so that the molded body is easily collapsed.

[Other Processes]

Figure 5:
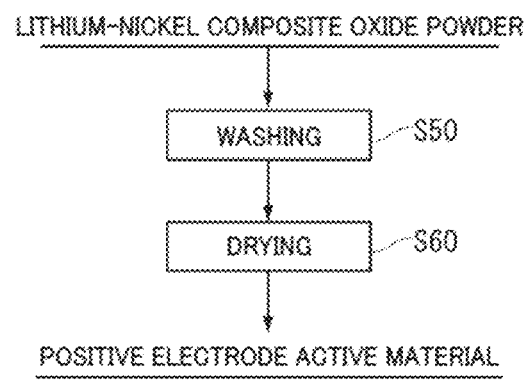
FIG. 5 is a diagram illustrating an example of the flow of a method for treating lithium-nickel composite oxide powder after crushing.

FIG. 5 is a diagram illustrating an example of the process of treating lithium-nickel composite oxide powder obtained after crushing. As illustrated in FIG. 5, the method for producing a positive electrode active material according to the present embodiment may include washing and filtering (washing process: step S50) the lithium-nickel composite oxide powder after the crushing process (step S40) and drying the washed lithium-nickel composite oxide (drying process: step S60). Note that, the method for producing a positive electrode active material according to the present embodiment may not include the washing process (step S50) and the drying process (step S60) described above, or may include at least one process of these two processes. Furthermore, the lithium-nickel composite oxide powder after the crushing process (step S40) may be used as it is as the positive electrode active material. Hereinafter, the respective processes will be described.

[Washing Process: Step S50]

As illustrated in FIG. 5, after the crushing process (step S40), the obtained crushed product (lithium-nickel composite oxide powder) may be washed (step S50). By washing the lithium-nickel composite oxide powder, surplus lithium or impurities on the surface of the lithium-nickel composite oxide particles are removed, and a positive electrode active material for a lithium ion secondary battery having a higher capacity and high thermal stability can be obtained. Here, the washing method is not particularly limited, and a known technique is used.

As the washing method, for example, it is preferable that the lithium-nickel composite oxide powder is invested to water to obtain a slurry, and then the slurry is stirred so that surplus lithium on the surface of the particles of the lithium-nickel composite oxide is sufficiently removed. After stirring, the slurry is solid-liquid separated and dries as described below (step S60), and thereby a lithium-nickel composite oxide (positive electrode active material) can be obtained.

As for the slurry concentration, it is preferable to insert 0.5 to 2 parts by mass of the lithium-nickel composite oxide powder with respect to 1 part by mass of water. When the insertion amount of the crushed product (lithium-nickel composite oxide powder) exceeds 2 parts by mass with respect to 1 part by mass of water as the slurry concentration, the viscosity becomes extremely higher so that stirring may be difficult, the dissolution rate of the adherend may be decreased due to equilibrium relation because the alkali level (pH) in the liquid is high, or separation from the powder may be difficult even when peeling-off occurs. On the other hand, when the insertion amount of the crushed product (lithium-nickel composite oxide powder) is less than 0.5 parts by mass with respect to 1 part by mass of water as the slurry concentration, the elution amount of lithium is large because the slurry is too dilute and de-inserting of lithium from the inside of crystal lattice of the lithium-nickel composite oxide powder also occurs, so that the crystal structure may be easily collapsed or the aqueous solution (slurry) having a high pH may absorb the carbon dioxide gas in air to cause lithium carbonate to be deposited again on the surface of the lithium-nickel composite oxide.

A cleaning liquid used in the washing process (step S50) is not particularly limited, and for example, water may be used. When water is used, for example, water of lower than 10 μS/cm is preferred and water of 1 μS/cm or lower is more preferred by electrical conductivity measurement. When water of lower than 10 μS/cm as found by electrical conductivity measurement is used, a deterioration in battery performance due to adherence of impurities to a positive electrode active material can be further suppressed.

When the above-described slurry is solid-liquid separated, it is preferable that adhesion water remaining on the surface of the particles of the lithium-nickel composite oxide is little. When the adhesion water is large, lithium dissolved in the liquid (in the slurry) may be deposited again, and the amount of lithium existing on the surface of the lithium-nickel composite oxide after drying (step S60) may be increased. In the solid-liquid separation, a centrifuge, a filter press, or the like, which is generally used, is used.

[Drying Process: Step S60]

After washing (step S50), drying may be performed to obtain a lithium-nickel composite oxide (positive electrode active material) (step S60). The drying conditions are not particularly limited as long as at least some of moisture in the lithium-nickel composite oxide is removed. The drying process (step S60) is preferably performed, for example, using a dryer capable of controlling the lithium-nickel composite oxide (powder) after filtration (solid-liquid separation) under a gas atmosphere containing no compound components including carbon and sulfur or a vacuum atmosphere, at a predetermined temperature.

The drying temperature is preferably 80° C. or higher and 550° C. or lower, and more preferably 120° C. or higher and 350° C. or lower. When the drying temperature is 80° C. or higher, the positive electrode active material after washing (step S50) can be dried within a short time period, and a lithium concentration gradient can be suppressed from taking place between the surface and the interior of particles. On the other hand, the drying temperature exceeding 550° C. provides a chance of collapsing the crystal structure in the vicinity of the surface of the lithium-nickel composite oxide which is predicted to be extremely close to a stoichiometric ratio or state-of-charge because of de-insertion of lithium to some degree, which may cause a deterioration in battery characteristics in the secondary battery.

Furthermore, the drying temperature is more preferably 120° C. or higher and 350° C. or lower from the viewpoint of productivity and thermal energy cost.

[Characteristics of Positive Electrode Active Material]

By the method for producing a positive electrode active material according to the present embodiment described above, a lithium-nickel composite oxide (positive electrode active material) having excellent crystallinity can be obtained with high productivity by firing in an extremely short time. Hereinafter, the characteristics of the lithium-nickel composite oxide (positive electrode active material) obtained by the production method according to the present embodiment will be described.

(Composition)

The lithium-nickel composite oxide is not particularly limited as long as it is an oxide containing lithium and nickel, a known composition can be adopted. For example, the lithium-nickel composite oxide may contain lithium (Li), nickel (Ni), cobalt (Co), and optionally an element (M1), and a molar ratio of respective metal elements may be represented as Li:Ni:Co:M1=s:(1−x−y):x:y (provided that, $0.93<s<1.30$, $0 \leq x \leq 0.50$, $0 \leq y \leq 0.40$, and $0.10 \leq (1-x-y) \leq 1.0$, and M1 is at least one element selected from the group consisting of an alkali metal, an alkali earth metal, a transition metal, a base metal, and a semimetal).

Furthermore, from the viewpoint of obtaining a high charge and discharge capacity, it is preferable that the lithium-nickel composite oxide contains lithium (Li), nickel (Ni), cobalt (Co), and aluminum (Al), and a molar ratio of respective metal elements is represented as Li:Ni:Co:Al=s:(1−x−y):x:y (provided that, $0.93<s<1.03$, $0.03 \leq x \leq 0.10$, and $0.03 \leq y \leq 0.10$).

Furthermore, the lithium-nickel composite oxide may contain lithium (Li), nickel (Ni), cobalt (Co), aluminum (Al), and an element M other than those, and an atomic number ratio of respective elements may be represented as Li:Ni:Co:Al:M=s:(1−x−y):x:y:z (provided that, $0.93<s<1.03$, $0.03 \leq x \leq 0.10$, $0.03 \leq y \leq 0.10$, and $0<z \leq 0.1$, and M is at least one element selected from the group consisting of an alkali metal, an alkali earth metal, a transition metal, a base metal, and a semimetal).

Furthermore, the lithium-nickel composite oxide has a crystal structure of the hexagonal system with a layered structure, and for example, may be represented by General Formula (1): $Li_sNi_{1-x-y}Co_xAl_yM_zO_{2+\alpha}$ (provided that, in Formula (1), $0.93<s<1.03$, $0.03 \leq x \leq 0.10$, $0.03 \leq y \leq 0.10$, $0 \leq z \leq 0.10$, and $-0.5 \leq \alpha \leq 0.5$, and M is at least one element selected from the group consisting of an alkali metal, an alkali earth metal, a transition metal, a base metal, and a semimetal).

(Lithium Site Occupancy)

The lithium site occupancy at the 3a site as a lithium main layer, which is obtained by Rietveld analysis of an X-ray diffraction pattern, of the lithium-nickel composite oxide is, for example, 95% or more, preferably 96% or more, and more preferably 97% or more. When the lithium site occupancy is in the above range, it is shown that the sintering reaction between the precursor (nickel compound) and the lithium compound is sufficiently performed in the firing process (step S30), and the lithium-nickel composite oxide has high crystallinity. When the lithium-nickel composite oxide having high crystallinity is used as a positive electrode active material of a secondary battery, excellent battery characteristics (such as a high battery capacity) is exhibited.

(Initial Charge and Discharge Capacity)

Figure 6:
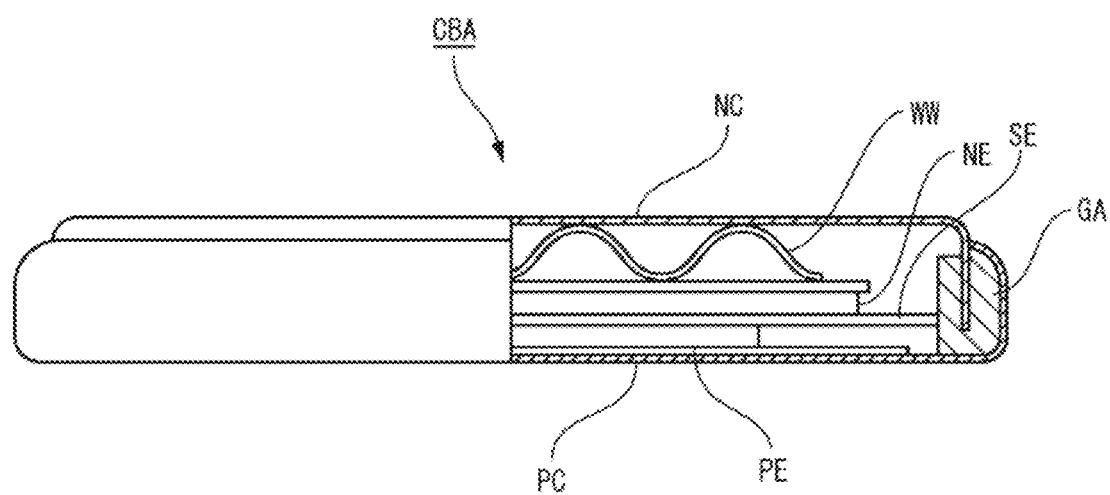
FIG. 6 is a diagram illustrating a secondary battery for evaluation used in Examples.

The initial charge capacity in a 2032 type coin type battery CBA (see FIG. 6) for evaluation produced using the lithium-nickel composite oxide as a positive electrode active material is 190 mAh/g, preferably 220 mAh/g or more, more preferably 230 mAh/g or more, and further preferably 235 mAh/g or more. The initial discharge capacity is, for example, 175 mAh/g, preferably 205 mAh/g or more, and more preferably 210 mAh/g or more. When the initial discharge capacity is in the above range, it is shown that the sintering reaction between the precursor (nickel compound) and the lithium compound is sufficiently performed in the firing process (step S30), and the lithium-nickel composite oxide has high crystallinity. Note that, the initial discharge capacity is a value obtained by measuring capacity when the coin type battery CBA used in Example is left about 24 hours after manufacture thereof to stabilize an open circuit voltage (OCV), then the battery is charged to a cutoff voltage of 4.3 V at a current density of 0.1 mA/cm$^2$ with respect to the positive electrode, the battery pauses for one hour, and then the battery is discharged to a cutoff voltage of 3.0 V.

(Carbon Content)

The total carbon content (total carbon amount) of the lithium-nickel composite oxide is preferably 0.5 mass % or less and more preferably 0.3 mass % or less. When the total carbon content is in the above range, it is shown that the organic compound particles used as a raw material are sufficiently removed by vaporization, thermal decomposition, or the like in the firing process. Note that, the total carbon content is a value that can be measured by a high-frequency combustion-infrared absorption method.

2. Molded Body

The molded body according to the present embodiment contains a nickel compound, a lithium compound, and organic compound particles and can be suitably used in producing of a positive electrode active material for a lithium ion secondary battery. In the molded body according to the present embodiment, as described above, a plurality of voids can be formed inside the fired body after firing (step S30), and thus the crushability of the fired body can be made extremely favorable.

As the method for forming voids in the fired body, for example, a method for forming holes in the molded body before firing by a drill or the like in advance to form voids in the fired body may be used; however, by containing the organic compound particles as well as the nickel compound and the lithium compound as described in the present embodiment, the organic compound particles are discharged as a gas when firing, and voids can be formed in portions in which the organic compound particles exist. Therefore, the number of man-hours is reduced and cost is reduced.

The nickel compound is not particularly limited as long as it is a compound containing nickel. The preferred composition and characteristics of the nickel compound are similar to those of the nickel compound in the aforementioned method for producing a positive electrode active material, and thus description thereof will be omitted.

The lithium compound is not particularly limited as long as it is a compound containing lithium, and from the viewpoint of further promoting the firing reaction, lithium hydroxide is preferred and lithium hydroxide having a moisture content of 1.5% or less and a total carbon (total carbon content) of 1.0% or less is more preferred. When the moisture content is 1.5% or less, the moisture generated at the time of firing is decreased, and the reaction between the nickel composite oxide and the lithium compound can efficiently proceed. Furthermore, lithium hydroxide reacts, for example, with carbon dioxide in air to form lithium carbonate having a high firing reaction temperature, but when the total carbon is in the above range, there is almost no influence on the firing reaction, and thus it is not necessary to increase the firing temperature or lengthen the firing time.

It is preferable that the molded body according to the present embodiment does not contain a binder. By containing lithium hydroxide having a moisture content of 1.5% or less and a total carbon of 1.0% or less as a raw material, the molded body can have a sufficient strength without using a binder. Furthermore, when the molded body does not contain a binder, a positive electrode active material with reduced amount of impurities can be obtained.

The size of the molded body according to the present embodiment is not particularly limited, and when the maximum value of the distance between two points on the outer shape at which crushing is hardly performed by a roughly crushing machine is 10 mm or more, the effect is large. Furthermore, the density of the molded body is preferably 1.3 g/cm$^3$ or more. The preferred ranges of the characteristics of the formed body such as the shape and density of the molded body are similar to those of the molded body in the aforementioned method for producing a positive electrode active material, and thus description thereof will be omitted.

3. Lithium Ion Secondary Battery

The method for producing a lithium ion secondary battery according to the present embodiment (hereinafter, also referred to as "method for producing a secondary battery") includes using a positive electrode, a negative electrode, and a non-aqueous electrolyte to obtain a lithium ion secondary battery, and the positive electrode is obtained using the positive electrode active material obtained by the aforementioned production method. Note that, the secondary battery obtained by the production method according to the present embodiment may include, for example, a positive electrode, a negative electrode, a separator, and a non-aqueous electrolyte solution or may include a positive electrode, a negative electrode, and a solid electrolyte. Furthermore, the secondary battery may include similar components to those of a known lithium ion secondary battery.

Hereinafter, as an example of the method for producing a secondary battery according to the present embodiment, the respective constituent materials of the secondary battery using a non-aqueous electrolyte solution and the method for producing the same will be described. Note that, an embodiment described below is merely an example, and the method for producing a secondary battery can be implemented in various modified forms or improved forms on the basis of knowledge of those skilled in the art on the basis of the embodiment described here. Furthermore, use of the secondary battery obtained by the production method according to the present embodiment is not particularly limited.

(Positive Electrode)

The positive electrode contains the positive electrode active material described above. The positive electrode can be produced, for example, as follows. Note that, the method for producing the positive electrode is not limited to the following example, and other methods may be adopted.

First, the positive electrode active material, a conductive material, and a binder (binding agent) are mixed together, activated carbon and a solvent for viscosity adjustment or the like are further added thereto if necessary, and this mixture is kneaded to produce a positive electrode mixture paste. Note that, the constituent materials of the positive electrode mixture paste are not particularly limited, and materials equivalent to those of a known positive electrode mixture paste may be used.

The mixing ratio of the respective materials in the positive electrode mixture paste is not particularly limited and is appropriately adjusted depending on the required performance of the secondary battery. The mixing ratio of the materials can be in a similar range to that in a known positive electrode mixture paste for secondary batteries. For example, when the total mass of solids in the positive electrode mixture excluding the solvent is 100 parts by mass, the content of the positive electrode active material may be 60 parts by mass or more and 95 parts by mass or less, the content of the conductive material may be 1 part by mass or more and 20 parts by mass or less, and the content of the binder may be 1 part by mass or more and 20 parts by mass or less.

Examples of the conductive agent which can be used include graphite (natural graphite, artificial graphite, expanded graphite, and the like), and a carbon black-based material such as acetylene black or ketjen black.

The binder (binding agent) plays a role of bonding active material particles together, and examples of the binder (binding agent) which can be used include polyvinylidene fluoride (PVDF), polytetrafluoroethylene (PTFE), fluorine-containing rubber, ethylene propylene diene rubber, styrene butadiene, a cellulose-based resin, and polyacrylic acid.

Note that, if necessary, a solvent which disperses the positive electrode active material, the conductive material, and activated carbon and dissolves the binder (binding agent) may be added to the positive electrode mixture paste. As the solvent, specifically, an organic solvent such as N-methyl-2-pyrrolidone (NMP) may be used. Furthermore, activated carbon may be added to the positive electrode mixture in order to increase electric double layer capacity.

Next, the obtained positive electrode mixture paste is applied to, for example, the surface of an aluminum foil current collector and dried to scatter the solvent, thereby producing a sheet-shaped positive electrode.

Pressurization may be performed by roll press or the like in order to increase electrode density if necessary. The sheet-shaped positive electrode can be cut into an appropriate size or the like depending on the intended battery and used in the fabrication of battery.

(Negative Electrode)

As the negative electrode, metal lithium, a lithium alloy, and the like may be used. Furthermore, as the negative electrode, a negative electrode may be used which is formed by mixing a binding agent with a negative electrode active material which can insert and de-insert lithium ions, adding an appropriate solvent thereto to form a paste-like negative electrode mixture, coating the surface of a metal foil current collector such as copper with the paste-like negative electrode mixture, drying the coated metal foil current collector, and compressing the resultant metal foil current collector in order to increase the electrode density if necessary.

As the negative electrode active material, for example, natural graphite, artificial graphite, a fired body of an organic compound such as a phenol resin, and a powdery body of a carbon substance such as coke can be used. As the negative electrode binding agent, a fluorine-containing resin such as PVDF can be used in the same manner as in the positive electrode. Furthermore, an organic solvent such as N-methyl-2-pyrrolidone can be used as a solvent for dispersing these active material and binding agent.

(Separator)

The separator is disposed by being interposed between the positive electrode and the negative electrode. The separator separates the positive electrode and the negative electrode from each other and retains the electrolyte, and a thin film which is formed of polyethylene, polypropylene, or the like and has a large number of minute holes can be used.

(Non-Aqueous Electrolyte)

As the non-aqueous electrolyte, for example, a non-aqueous electrolyte solution can be used.

As the non-aqueous electrolyte solution, for example, a solution obtained by dissolving a lithium salt as a supporting salt in an organic solvent can be used. Furthermore, as the non-aqueous electrolyte solution, a solution obtained by dissolving a lithium salt in an ionic liquid may be used. Note that, the ionic liquid is a salt including a cation other than a lithium ion and an anion, and being in a liquid state even at room temperature.

As the organic solvent, one selected from a cyclic carbonate such as ethylene carbonate, propylene carbonate, butylene carbonate, and trifluoropropylene carbonate, a chain carbonate such as diethyl carbonate, dimethyl carbonate, ethyl methyl carbonate, and dipropyl carbonate, an ether compound such as tetrahydrofuran, 2-methyltetrahydrofuran, and dimethoxyethane, a sulfur compound such as ethylmethylsulfone and butanesultone, and a phosphorus compound such as triethyl phosphate and trioctyl phosphate may be used singly, or two or more selected from these compounds can also be mixed to be used.

As the supporting salt, $LiPF_6$, $LiBF_4$, $LiClO_4$, $LiAsF_6$, $LiN(CF_3SO_2)_2$, any composite salt thereof, and the like can be used. Further, the non-aqueous electrolyte solution may contain a radical scavenger, a surfactant, a flame retardant, and the like.

Furthermore, as the non-aqueous electrolyte, a solid electrolyte may be used. The solid electrolyte has the property of withstanding a high voltage. Examples of the solid electrolyte include an inorganic solid electrolyte and an organic solid electrolyte.

Examples of the inorganic solid electrolyte include an oxide-based solid electrolyte and a sulfide solid electrolyte.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from the group consisting of lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ ($0 \le X \le 1$), $Li_{1+x}Al_xGe_{2-x}(PO_4)_3$ ($0 \le X \le 1$), $LiTi_2(PO_4)_3$, $Li_{3x}La_{2/3-x}TiO_3$ ($0 \le X \le 2/3$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$ can be used.

The sulfide solid electrolyte is not particularly limited, and for example, one that contains sulfur (S) and exhibits lithium ion conductivity and electron insulating property can be suitably used. As the sulfide solid electrolyte, for example, one or more selected from the group consisting of $Li_2S$—$P_2S_5$, $Li_2S$—$SiS_2$, $LiI$—$Li_2S$—$SiS_2$, $LiI$—$Li_2S$—$P_2S_5$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$ can be used.

Note that, as the inorganic solid electrolyte, inorganic solid electrolytes other than those described above may be used and, for example, $Li_3N$, $LiI$, $LiOH$, and the like may be used.

The organic solid electrolyte is not particularly limited as long as it is a polymer compound exhibiting ionic conductivity, and for example, polyethylene oxide, polypropylene oxide, and copolymers of these can be used. Furthermore, the organic solid electrolyte may contain a supporting salt (lithium salt).

(Shape and Configuration of Battery)

The lithium ion secondary battery according to the present embodiment including the positive electrode, the negative electrode, and the non-aqueous electrolyte described above can have various shapes such as a cylindrical shape and a laminated shape. Even when the secondary battery has any shape, the positive electrode and the negative electrode are laminated with the separator interposed therebetween to form an electrode body, the obtained electrode body is impregnated with the non-aqueous electrolyte solution, a positive electrode collector is connected to a positive electrode terminal communicating with the outside using a current collecting lead or the like, a negative electrode collector is connected to a negative electrode terminal communicating with the outside using a current collecting lead or the like, and the resulting product is sealed in a battery case to complete the lithium ion secondary battery. Note that, when a solid electrolyte is adopted, the solid electrolyte may also serve as a separator.

EXAMPLES

Hereinafter, the present invention will be specifically described using Examples of the present invention, but the present invention is not limited by these Examples at all. Regarding the fired product of the molded body obtained by the present embodiment, crushability was evaluated using a roll crusher.

Furthermore, regarding the positive electrode active material obtained by the present embodiment, the positive electrode mixture paste using this positive electrode active material, and the lithium ion secondary battery, performance (initial discharge capacity) thereof was measured. Note that, in the present examples, samples of special grade reagents manufactured by Wako Pure Chemical Industries, Ltd. were used for producing a composite hydroxide, a positive electrode active material, and a secondary battery.

[Crushability Evaluation]

A roll crusher was used in crushability evaluation. The gap between rolls of the roll crusher was set to 3 mm, the height at which the fired body (the fired product of the molded body) inserted to the roll was set to 2 m, the amount of the fired body remaining on the roll was measured after being crushed for 1 minute, the residual amount with respect to the insertion amount was calculated, and the crushability was evaluated.

[Cracking Occurrence Rate]

One hundred molded bodies were produced, and an occurrence rate of cracks during conveyance to the firing furnace (cracking occurrence rate) was evaluated.

[Production and Evaluation of Secondary Battery for Evaluation]

The 2032 type coin type battery CBA (see FIG. 6) was produced by the following method, and the battery characteristics of the positive electrode active material were evaluated.

(Production of Coin Type Battery CBA)

52.5 mg of the positive electrode active material, 15 mg of acetylene black, and 7.5 mg of polytetrafluoroethylene resin (PTFE) were mixed and press-molded so as to have a diameter of 11 mm and a thickness of 100 μm at a pressure of 100 MPa, thereby producing a positive electrode PE (electrode for evaluation). This produced positive electrode PE was dried in a vacuum dryer at 120° C. for 12 hours. Using the dried positive electrode PE, a negative electrode NE, a separator SE, and an electrolyte solution, a coin type battery CBA illustrated in FIG. 6 was produced in a glove box having an Ar atmosphere whose dew point was managed at −80° C.

A negative electrode sheet punched into a disk shape having a diameter of 14 mm and obtained by coating graphite powder having an average particle size of about 20 μm and polyvinylidene fluoride to a copper foil was used as the negative electrode NE, and an equivalent mixed solution (manufactured by Tomiyama Pure Chemical Industries, Ltd.) of ethylene carbonate (EC) and diethyl carbonate (DEC) containing 1 M $LiPF_6$ as a supporting electrolyte was used as the electrolyte solution. As the separator SE, a polyethylene porous film having a thickness of 25 μm was used. Furthermore, the coin type battery CBA included a gasket GA and a wave washer WW and was assembled into a coin-shaped battery by a positive electrode can PC and a negative electrode can NC.

(Initial Charge and Discharge Capacity)

For initial charge and discharge capacity, the capacity when the coin type battery CBA was left for about 24 hours after production thereof to stabilize an open circuit voltage (OCV), then the battery was charged to a cutoff voltage of 4.3 V at a current density of 0.1 $mA/cm^2$ with respect to the positive electrode, was regarded as initial charge capacity, and the capacity when the battery paused for one hour, and then the battery was discharged to a cutoff voltage of 3.0 V, was regarded as initial discharge capacity.

Example 1

The nickel composite oxide obtained by oxidation-roasting the nickel composite hydroxide having a metal element composition ratio of Ni:Co:Al=91:4:5 by a rotary kiln and lithium hydroxide having a moisture content of 1.5 mass % or less and a total carbon of 1.0 mass % or less were mixed to have the Li/Me ratio of 1.02, and stearic acid (melting point: 69.6° C., boiling point: 383° C.) having an average particle size of 1 mm was further added as the organic compound particles to have the mixing ratio of 5 mass %, thereby producing a lithium mixture.

13050 g of the produced lithium mixture powder was put into a mold having a size of 300 mm×300 mm, and was pressurized at a molding surface pressure of 300 $kg/cm^2$ by an oil hydraulic press to produce a molded body having a thickness of 100 mm, and the density thereof was 1.45 $g/cm^2$. One hundred molded bodies were produced, and the cracking occurrence rate during conveyance to the firing furnace was checked. The results thereof are presented in Table 2. The temperature of the molded body immediately after molding was 26° C. to 28° C.

The above-described molded body was heated from room temperature (25° C.) to 745° C. in an atmosphere of 90 vol % of oxygen, after the temperature of the center of the molded body reached 745° C., the temperature was held at 745° C. for 2 hours and the molded body was cooled to 150° C. or lower, the fired product of the molded body was then crushed by a roll crusher, the weight of the fired product remaining on the roll without being crushed was measured, and the remaining percentage was calculated. The results are presented in Table 2. Thereafter, pulverization was performed by a pin mill, washing, filtering, and drying were performed, and then the crystallite diameter and the Li site occupancy of dried powder were measured using X-ray diffraction. The results thereof are also presented in Table 2.

Furthermore, the results of evaluation of the battery characteristics in the coin type battery are also presented in Table 2.

Example 2

The operation was performed in the same manner as in Example 1, except that the average particle size of stearic acid to be mixed was set to 4 mm. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 3

The operation was performed in the same manner as in Example 1, except that the average particle size of stearic acid to be mixed was set to 7 mm. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 4

The operation was performed in the same manner as in Example 1, except that the mixing ratio of stearic acid to be mixed was set to 10%. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 5

The operation was performed in the same manner as in Example 1, except that the average particle size of stearic acid to be mixed was set to 0.5 mm. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 6

The operation was performed in the same manner as in Example 1, except that the average particle size of stearic acid to be mixed was set to 8 mm. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 7

The operation was performed in the same manner as in Example 1, except that the mixing ratio of stearic acid to be mixed was set to 3%. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 8

The operation was performed in the same manner as in Example 1, except that the mixing ratio of stearic acid to be mixed was set to 12%. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 9

The operation was performed in the same manner as in Example 1, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 10

The operation was performed in the same manner as in Example 2, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 11

The operation was performed in the same manner as in Example 3, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 12

The operation was performed in the same manner as in Example 4, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of stearic acid particles are presented in Table 1, and the evaluation results are presented in Table 2. The temperature of the molded body immediately after molding was equal to that of Example 1.

Example 13

The operation was performed in the same manner as in Example 5, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 14

The operation was performed in the same manner as in Example 6, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 15

The operation was performed in the same manner as in Example 7, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 16

The operation was performed in the same manner as in Example 8, except that the composition ratio of the metal elements in the nickel composite hydroxide was set to Ni:Co:Al=88:9:3 and the holding temperature was set to 760° C. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 17

The operation was performed in the same manner as in Example 9, except that polyethylene having an average particle size of 1 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 18

The operation was performed in the same manner as in Example 10, except that polyethylene having an average particle size of 4 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 19

The operation was performed in the same manner as in Example 11, except that polyethylene having an average particle size of 7 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 20

The operation was performed in the same manner as in Example 12, except that polyethylene having an average particle size of 1 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 21

The operation was performed in the same manner as in Example 13, except that polyethylene having an average particle size of 0.5 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 22

The operation was performed in the same manner as in Example 14, except that polyethylene having an average particle size of 8 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 23

The operation was performed in the same manner as in Example 15, except that polyethylene having an average particle size of 1 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Example 24

The operation was performed in the same manner as in Example 16, except that polyethylene having an average particle size of 1 mm was used as the organic compound particles. The composition of the nickel compound, the Li/Me ratio, and the average particle size and the mixing ratio of the organic compound particles are presented in Table 1, and the evaluation results are presented in Table 2. The temperature of the molded body immediately after molding was equal to that of Example 1.

Comparative Example 1

The operation was performed in the same manner as in Example 1, except that stearic acid was not added. The composition of the nickel compound, the Li/Me ratio, and the mixing ratio of the organic compound particles are presented in Table 1, and the evaluation results are presented in Table 2. The temperature of the molded body immediately after molding was equal to that of Example 1.

Comparative Example 2

The operation was performed in the same manner as in Example 9, except that stearic acid was not added. The composition of the nickel compound, the Li/Me ratio, and the mixing ratio of the organic compound particles are presented in Table 1, and the evaluation results are presented in Table 2. The temperature of the molded body immediately after molding was equal to that of Example 1.

TABLE 1

| | Nickel compound | | | Li/Me ratio | Organic compound particles | | |
|---|---|---|---|---|---|---|---|
| | Ni | Co | Al | | Variaty | Average particle size (mm) | Mixing ratio (mass %) |
| Example 1 | 91 | 4 | 5 | 1.02 | Stearic acid | 1 | 5 |
| Example 2 | 91 | 4 | 5 | 1.02 | Stearic acid | 4 | 5 |
| Example 3 | 91 | 4 | 5 | 1.02 | Stearic acid | 7 | 5 |
| Example 4 | 91 | 4 | 5 | 1.02 | Stearic acid | 1 | 10 |
| Example 5 | 91 | 4 | 5 | 1.02 | Stearic acid | 0.5 | 5 |
| Example 6 | 91 | 4 | 5 | 1.02 | Stearic acid | 8 | 5 |
| Example 7 | 91 | 4 | 5 | 1.02 | Stearic acid | 1 | 3 |
| Example 8 | 91 | 4 | 5 | 1.02 | Stearic acid | 1 | 12 |
| Example 9 | 88 | 9 | 3 | 1.02 | Stearic acid | 1 | 5 |
| Example 10 | 88 | 9 | 3 | 1.02 | Stearic acid | 4 | 5 |
| Example 11 | 88 | 9 | 3 | 1.02 | Stearic acid | 7 | 5 |
| Example 12 | 88 | 9 | 3 | 1.02 | Stearic acid | 1 | 10 |
| Example 13 | 88 | 9 | 3 | 1.02 | Stearic acid | 0.5 | 5 |
| Example 14 | 88 | 9 | 3 | 1.02 | Stearic acid | 8 | 5 |
| Example 15 | 88 | 9 | 3 | 1.02 | Stearic acid | 1 | 3 |
| Example 16 | 88 | 9 | 3 | 1.02 | Stearic acid | 1 | 12 |
| Example 17 | 88 | 9 | 3 | 1.02 | Polyethylene | 1 | 5 |
| Example 18 | 88 | 9 | 3 | 1.02 | Polyethylene | 4 | 5 |
| Example 19 | 88 | 9 | 3 | 1.02 | Polyethylene | 7 | 5 |
| Example 20 | 88 | 9 | 3 | 1.02 | Polyethylene | 1 | 10 |
| Example 21 | 88 | 9 | 3 | 1.02 | Polyethylene | 0.5 | 5 |
| Example 22 | 88 | 9 | 3 | 1.02 | Polyethylene | 8 | 5 |
| Example 23 | 88 | 9 | 3 | 1.02 | Polyethylene | 1 | 3 |
| Example 24 | 88 | 9 | 3 | 1.02 | Polyethylene | 1 | 12 |
| Comparative Example 1 | 91 | 4 | 5 | 1.02 | — | — | 0 |
| Comparative Example 2 | 88 | 9 | 3 | 1.02 | — | — | 0 |

TABLE 2

| | Molded body | | Positive electrode active material | | | Battery characteristics | |
|---|---|---|---|---|---|---|---|
| | Remaining percentage (mass %) on crusher* | Cracking occurrence rate (number %) | Crystallite diameter (nm) | Li site occupancy (%) | Total carbon (mass %) | Charge capacity (mAh/g) | Discharge capacity (mAh/g) |
| Example 1 | 0 | 0 | 118.1 | 97.7 | 0.07 | 238.0 | 213.4 |
| Example 2 | 0 | 0 | 114.4 | 97.8 | 0.11 | 237.9 | 213.0 |
| Example 3 | 0 | 1 | 114.3 | 97.5 | 0.07 | 239.6 | 213.2 |
| Example 4 | 0 | 0 | 116.9 | 97.5 | 0.07 | 237.9 | 213.2 |
| Example 5 | 10 | 0 | 114.7 | 97.8 | 0.09 | 240.4 | 213.9 |
| Example 6 | 0 | 5 | 118.8 | 97.6 | 0.08 | 238.2 | 213.5 |
| Example 7 | 2 | 0 | 113.9 | 97.6 | 0.08 | 239.1 | 213.4 |
| Example 8 | 0 | 3 | 116.9 | 97.9 | 0.08 | 238.7 | 213.7 |
| Example 9 | 1 | 0 | 150.2 | 98.1 | 0.15 | 234.1 | 210.6 |
| Example 10 | 0 | 0 | 148.2 | 98.4 | 0.18 | 233.8 | 210.4 |
| Example 11 | 0 | 0 | 155.4 | 98.3 | 0.16 | 233.3 | 209.7 |
| Example 12 | 0 | 0 | 146.3 | 98.4 | 0.13 | 233.9 | 210.6 |
| Example 13 | 15 | 0 | 149.9 | 98.4 | 0.17 | 234.0 | 209.8 |

TABLE 2-continued

|  | Molded body | | Positive electrode active material | | | Battery characteristics | |
| --- | --- | --- | --- | --- | --- | --- | --- |
|  | Remaining percentage (mass %) on crusher* | Cracking occurrence rate (number %) | Crystallite diameter (nm) | Li site occupancy (%) | Total carbon (mass %) | Charge capacity (mAh/g) | Discharge capacity (mAh/g) |
| Example 14 | 0 | 3 | 144.7 | 98.4 | 0.18 | 233.8 | 209.8 |
| Example 15 | 3 | 0 | 151.8 | 98.7 | 0.13 | 233.8 | 209.9 |
| Example 16 | 0 | 2 | 148.6 | 98.3 | 0.15 | 233.9 | 209.6 |
| Example 17 | 2 | 0 | 147.3 | 98.3 | 0.26 | 233.7 | 210.5 |
| Example 18 | 0 | 0 | 148.1 | 98.5 | 0.26 | 234.0 | 210.1 |
| Example 19 | 0 | 0 | 143.8 | 98.4 | 0.25 | 233.1 | 209.4 |
| Example 20 | 0 | 0 | 145.9 | 98.4 | 0.25 | 233.7 | 210.2 |
| Example 21 | 11 | 0 | 152.8 | 98.2 | 0.27 | 234.2 | 209.8 |
| Example 22 | 0 | 3 | 151.9 | 98.6 | 0.24 | 233.7 | 209.8 |
| Example 23 | 2 | 0 | 142.2 | 98.7 | 0.28 | 233.6 | 209.5 |
| Example 24 | 0 | 2 | 148.4 | 98.4 | 0.24 | 233.6 | 209.3 |
| Comparative Example 1 | 74 | 0 | 116.8 | 97.7 | 0.09 | 237.2 | 213.2 |
| Comparative Example 2 | 66 | 0 | 150.3 | 98.4 | 0.16 | 232.3 | 208.9 |

*A roll crusher was used as a crusher.

[Evaluation Results]

In the fired bodies (the fired products of the molded bodies) containing the organic compound particles obtained in Examples, as presented in Table 2, as compared to the molded bodies not containing the organic compound particles of Comparative Examples, the product that was not crushed and remained on the roll crusher was extremely decreased. Note that, it was confirmed that voids were formed in the fired bodies (the fired products of the molded bodies) obtained in Examples.

Furthermore, the positive electrode active materials obtained in Examples have, as presented in Table 2, include the same degrees of the crystallite diameter, the Li site occupancy, and the charge and discharge capacity as those of Comparative Examples, which shows that the sintering reaction was sufficiently performed and a lithium-nickel composite oxide having high crystallinity was obtained.

From the above, it is obvious that, in the production method of Examples, the organic compound particles get out of the molded body as a gas to form voids in the firing process, and due to this, crushability is improved.

Note that, in Example 5, Example 13, and Example 21 using organic compound particles having an average particle size of 0.5 mm, the residue on the roll crusher was slightly more than that in other Examples. The reason for this is conceivable that, since the size of the organic compound particles was smaller than 1 mm, the formed voids were small, and thus the effect of improving crushability was small.

Furthermore, in Examples 7, 15, and 23 in which the mixing ratio of the organic compound particles is 3 mass %, since there remained some residue on the roll crusher but the mixing ratio of the organic compound particles was relatively lower than that in other Examples, and the number of voids was small, it is conceivable that the effect of improving crushability was small.

Furthermore, in Examples 6, 14, and 22 in which the average particle size of the organic compound particles is 8 mm, crushability was favorable, but there was a molded body which was broken during conveyance to a firing furnace. The reason for this is conceivable that, since the average particle size of the organic compound particles was large, the strength of the molded body was decreased.

Furthermore, in Examples 8, 16, and 24 in which the mixing ratio of the organic compound particles is 12 mass, crushability was favorable, but there was a molded body which was broken during conveyance to a firing furnace. The reason for this is conceivable that, since the mixing ratio of the organic compound particles was high, the strength of the molded body was decreased.

Note that, in Examples 17 to 24 using polyethylene as the organic compound particles, the carbon amount in the positive electrode active material was slightly larger than that in Examples 9 to 16 using stearic acid as the organic compound particles, but this amount was in a range where there were no practical problems.

It should be noted that the technical scope of the present invention is not limited to the aspects described in the embodiments and the like. One or more of the requirements described in the embodiments and the like may be omitted. Furthermore, the requirements described in the embodiments and the like can be combined as appropriate. Furthermore, to the extent permitted by law, the disclosure of Japanese Patent Application No. 2019-002918, which is a Japanese patent application, and all the literatures cited in the above-described embodiment and the like is incorporated as part of the description of this text.

INDUSTRIAL APPLICABILITY

According to the method for producing a positive electrode active material for a lithium ion secondary battery of the present invention, since the organic compound particles are mixed with the lithium mixture to obtain a molded body, a plurality of voids can be formed in the molded body when firing, and the crushability of the molded body is significantly improved. Therefore, the molded body can be crushed by an inexpensive crusher used in crushing of a lithium mixture that is not molded. Therefore, also in environmentally compatible cars (xEVs) requiring a high capacity in a secondary battery, a positive electrode active material can be provided at lower cost.

REFERENCE SIGNS LIST

10 Molded body
20 Fired body

21 Void
t Height of molded body
CBA Coin type battery
NC Negative electrode can
NE Negative electrode
PC Positive electrode can
PE Positive electrode
SE Separator
GA Gasket
WW Wave washer

The invention claimed is:

1. A molded body being used in producing of a positive electrode active material for a lithium ion secondary battery, the molded body comprising a nickel compound, a lithium compound, and organic compound particles,
wherein the nickel compound is composed of a nickel composite oxide, and a density of the molded body is 1.3 g/cm$^3$ or more.

2. The molded body according to claim 1, wherein the organic compound particles are solid at a temperature of the molded body in molding.

3. The molded body according to claim 1, wherein the organic compound particles evaporate at a temperature lower than a melting temperature of the lithium compound.

4. The molded body according to claim 1, wherein the organic compound particles are thermally decomposed into a gas at a temperature lower than a melting temperature of the lithium compound.

5. The molded body according to claim 1, wherein a size of the organic compound particles is 0.1 mm or more and 10 mm or less.

6. The molded body according to claim 1, wherein a content of the organic compound particles is 3 mass % or more and 12 mass % or less with respect to the molded body.

7. The molded body according to claim 1, wherein the lithium compound is composed of lithium hydroxide, lithium nitrate, lithium carbonate, lithium acetate, or a mixture thereof.

8. The molded body according to claim 1, wherein the nickel compound contains nickel (Ni) and optionally cobalt (Co) and an element (M1), and a molar ratio of respective metal elements is represented as Ni:Co:M1=(1−x−y):x:y (provided that, 0≤x≤0.50, 0≤y≤0.40, and 0.10≤(1−x−y)≤1.0, and MI is at least one element selected from the group consisting of an element other than Ni and Co, an alkali metal, an alkali earth metal, a transition metal, a base metal, and a semimetal).

9. A method for producing a positive electrode active material for a lithium ion secondary battery containing lithium-nickel composite oxide, the method comprising:
mixing a nickel compound, a lithium compound, and organic compound particles to obtain a lithium mixture;
molding the lithium mixture to obtain a molded body;
firing the molded body to obtain a fired body; and
crushing the fired body to obtain lithium-nickel composite oxide powder,
wherein the nickel compound is composed of a nickel composite oxide, and a density of the molded body is 1.3 g/cm$^3$ or more.

10. The method for producing a positive electrode active material for a lithium ion secondary battery according to claim 9, wherein the organic compound particles are solid at a temperature of the molded body in molding.

11. The method for producing a positive electrode active material for a lithium ion secondary battery according to claim 9, wherein the organic compound particles evaporate at a temperature lower than a melting temperature of the lithium compound.

12. The method for producing a positive electrode active material for a lithium ion secondary battery according to claim 9, wherein the organic compound particles are thermally decomposed into a gas at a temperature lower than a melting temperature of the lithium compound.

13. The method for producing a positive electrode active material for a lithium ion secondary battery according to claim 9, wherein an average particle size of the organic compound particles is 0.1 mm or more and 10 mm or less.

14. The method for producing a positive electrode active material for a lithium ion secondary battery according to claim 9, wherein a mixing amount of the organic compound particles is 3 mass % or more and 12 mass % or less with respect to the lithium mixture.

15. The method for producing a positive electrode active material for a lithium ion secondary battery according to claim 9, wherein the lithium compound is composed of lithium hydroxide, lithium nitrate, lithium carbonate, lithium acetate, or a mixture thereof.

16. The method for producing a positive electrode active material for a lithium ion secondary battery according to claim 9, wherein the lithium-nickel composite oxide contain lithium (Li) and nickel (Ni), and optionally cobalt (Co) and an element (M1), and a molar ratio of respective metal elements is represented as Li:Ni:Co:M1=s: (1−x−y): x: y (provided that, 0.93<s<1.30, 0 ≤x ≤0.50, 0≤y≤0.40, and 0.10≤(1−x−y)≤1.0, and M1 is at least one element selected from the group consisting of an element other than Li, Ni, and Co, an alkali metal, an alkali earth metal, a transition metal, a base metal, and a semimetal).

17. The method for producing a positive electrode active material for a lithium ion secondary battery according to claim 9, wherein the firing is performed at 650° C. or higher and 1000° C. or lower for a holding time of a firing temperature of 10 hours or shorter.

18. The method for producing a positive electrode active material for a lithium ion secondary battery according to claim 9, comprising washing, filtering, and then drying the lithium-nickel composite oxide powder.

19. The method for producing a positive electrode active material for a lithium ion secondary battery according to claim 9, wherein a lithium site occupancy at the 3a site, which is obtained by Rietveld analysis of an X-ray diffraction pattern, of the lithium-nickel composite oxide is 97.0% or more.

* * * * *